Aug. 13, 1929.  E. S. MILLER  1,724,214
BATTERY CONNECTER
Filed April 28, 1928
Fig. 1.
Fig. 4.
Fig. 2.
Fig. 3.
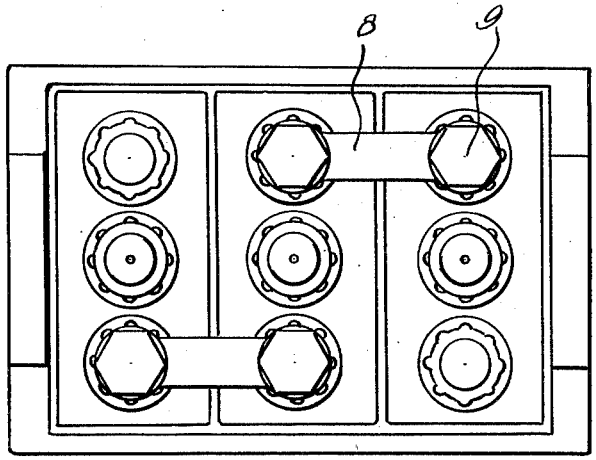
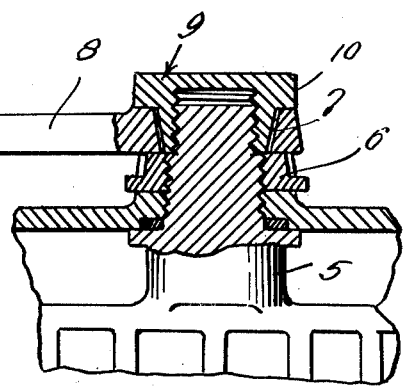
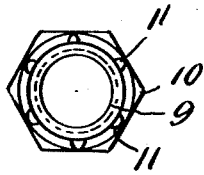
Inventor
E. S. Miller,
By Clarence A. O'Brien
Attorney Patented Aug. 13, 1929.

1,724,214

UNITED STATES PATENT OFFICE.

EDWARD S. MILLER, OF ROANOKE, VIRGINIA.

BATTERY CONNECTER.

Application filed April 28, 1928. Serial No. 273,576.

The present invention relates to a battery connection and the advantages and objects thereof will appear as the description proceeds having reference to the accompanying drawings wherein:

Figure 1 is a top plan view of the battery with my improved connection,

Figure 2 is a detail sectional view of the connections at the post of a pillar strap, and Figure 3 is a bottom plan view of the nut forming part of the connection.

Figure 4 is a side elevation of the nut shown in Figure 3.

Referring to the drawing in detail it will be seen that the numeral 5 denotes the permanently threaded post of a pillar strap extending through the top of the battery in any well known manner.

A nut 6 is threaded on the post to lock the same to the cover of the battery. The extremity of the post is slightly reduced and threaded and extends through the downwardly tapered opening 7 at one end of link connection 8. A nut 9 is threaded on the extremity of the post and has an enlarged cap portion 10 to rest on top of the link while the exterior surface of the body portion thereof is irregular or formed with teeth 11 to scrape the interior wall of the link 8 formed by the opening 7.

The nut with its irregular surface is adapted to enter the aperture of the connecting link and function as a scraper, to cleanse oxidation from said aperture of the connecting link, and thus assuring a perfect connection.

This link is adapted to receive the permanent threaded post of the pillar strap which extends through the aperture, the threaded post being held in position with a lock nut clamping the pillar strap to cover of the battery jar.

The new style of cover may thus be used for suspending the plates and preventing short circuit on the ribs of the finger and preventing broken grid frames. This eliminates pounding on the ribs and buckling of the plates due to space for expansion of metallic lead grid with expansion of action material pasted in said grid.

It is thought that the construction, and advantages of the invention will now be quite apparent to those skilled in this art without a more detailed description thereof. The present embodiment of the invention has been disclosed in detail merely for the purpose of invention since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a battery connection, a post having exterior threads, a lock nut on the post to hold the same on the cover of the battery, a threaded extension on the post, a link having an aperture receiving the threaded extension, and a nut threaded on the threaded extension having a roughened exterior surface within the opening of the link.

2. In a battery connection, a post having exterior threads, a lock nut on the post to hold the same on the cover of the battery, a threaded extension on the post, a link having an aperture receiving the threaded extension, and a nut threaded on the threaded extension having a roughened exterior surface within the opening of the link, said nut being enlarged at its top to form a cap to engage the plate on the post.

In testimony whereof I affix my signature.

EDWARD S. MILLER.